United States Patent
Tiesler et al.

(10) Patent No.: US 7,311,426 B2
(45) Date of Patent: Dec. 25, 2007

(54) ADJUSTABLE BEAM LAMP

(75) Inventors: John M. Tiesler, Harrison Township, MI (US); Shu-Hsiung Chou, Rochester Hills, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 335 days.

(21) Appl. No.: 10/904,508

(22) Filed: Mar. 10, 2005

(65) Prior Publication Data

US 2007/0053194 A1 Mar. 8, 2007

(51) Int. Cl.
*B60Q 3/02* (2006.01)

(52) U.S. Cl. .................. 362/488; 362/523; 362/418; 362/419; 362/490

(58) Field of Classification Search .......... 362/470, 362/471, 490, 488, 523, 418, 419, 421
See application file for complete search history.

(56) References Cited

U.S. PATENT DOCUMENTS

| | | | | |
|---|---|---|---|---|
| 2,999,150 | A * | 9/1961 | Kallel | 362/547 |
| 4,554,617 | A | 11/1985 | Tyler | 362/61 |
| 4,867,498 | A * | 9/1989 | Delphia et al. | 296/37.7 |
| 5,070,434 | A * | 12/1991 | Suman et al. | 362/490 |
| 5,461,552 | A | 10/1995 | Tillery | 362/188 |
| 5,951,155 | A * | 9/1999 | Lanser | 362/490 |
| 6,062,709 | A | 5/2000 | Cunnien et al. | 362/267 |
| 6,193,395 | B1 | 2/2001 | Logan | 362/285 |
| 6,540,386 | B2 | 4/2003 | Fujino et al. | 362/525 |
| 6,585,391 | B1 | 7/2003 | Koch et al. | 362/205 |
| 7,220,029 | B2 * | 5/2007 | Bynum et al. | 362/490 |
| 7,249,873 | B2 * | 7/2007 | Tiesler et al. | 362/488 |
| 2004/0095759 | A1 | 5/2004 | Koch et al. | 362/205 |

* cited by examiner

*Primary Examiner*—Anabel Ton
(74) *Attorney, Agent, or Firm*—Brooks Kushman P.C.

(57) ABSTRACT

A LED swivel reading lamp having an easily user adjustable sized light beam for use in vehicles such as automobiles, aircraft, and the like.

10 Claims, 9 Drawing Sheets

ADJUSTABLE BEAM LAMP

BACKGROUND OF THE INVENTION

1. Field of the Invention

The present invention generally relates to reading lamps particularly LED swivel reading lamps. More specifically, the present invention relates to LED swivel reading lamps having an adjustable diameter light beam.

2. Description of the Related Art

It has long been known to mount a reading light in a vehicle. However, most of the reading lights on the market can only give light with a fixed beam size and furthermore, the bulbs thereof are easily burned out due to overheating. It would be desirable to provide a vehicle reading light having an adjustable beam size and long bulb light with as little heat generation as possible.

For example, U.S. Pat. No. 4,554,617 issued Nov. 19, 1988 to Tyler teaches a mechanism for manually adjusting the horizontal position of a lamp light bulb.

U.S. Pat. No. 5,461,552 issued Oct. 24, 1995 to Tillery teaches a flashlight wherein rotating the reflector housing unit on the battery housing unit both turns the flashlight on and off, and also adjusts the light beam by moving the bulb in relation to the reflector.

U.S. Pat. No. 6,062,709 issued May 16, 2000 to Cunnien et al. teaches the use of a single seal member to seal both the reflector and housing as well as sealing between the reflector and bulb preventing dirt and moisture from entering the lamp assembly.

U.S. Pat. No. 6,193,395 issued Feb. 27, 2001 to Logan teaches a lamp that can have the beam width adjusted by means of moving the lamp leans and reflector assembly in relation to the fixed bulb.

U.S. Pat. No. 6,540,386 issued Apr. 1, 2003 to Fujino et al. teaches a multiple headlamp/reflector device that allows for the independent manual aiming of the reflector or tandem manual aiming of the pair of reflectors by means of adjustment screws.

U.S. Pat. No. 6,585,391 issued Jul. 1, 2003 to Koch et al. teaches a flashlight with a fixed bulb and fixed reflector. U.S. Patent Application Publication Number 2004/0095759 published May 20, 2004 to Koch et al. teaches a flashlight with a fixed bulb and fixed reflector.

DISCLOSURE OF THE INVENTION

The present invention provides advantages and alternatives over the prior art by providing an adjustable beam lamp providing long life and cool operating temperatures.

According to a further aspect of the present invention, there is provided an adjustable beam lamp that allows the user to adjust easily the size of the light beam to accommodate the user's needs.

According to yet another aspect of the present invention provides for an adjustable beam lamp that is easily manufactured and cost effective.

According to a yet further aspect of the present invention there is provided an adjustable beam lamp assembly for use in passenger compartments comprising in cooperative combination: a lamp housing insert, a bezel front and bezel back, an dome shaped dome shaped eyeball housing, a lead frame, an LED mounted on a LED board, a LED retainer socket front and LED retainer socket back, a ball post, a light tube, a push/push switch, and a push/push button; wherein said dome shaped dome shaped eyeball housing comprises an dome shaped eyeball having a collar surrounding a light passage bore, said collar extending through said eyeball and said collar further comprising a plurality grooves having groove stops located at a first end of said collar located on the concave side of said dome shaped eyeball; said light tube moveable within said dome shaped eyeball collar and having a first end having located thereon a plurality of retaining snaps mountable within said complimentary plurality of collar grooves, having a second end a flanged top, and a mid wall located within said light tube wherein said mid wall has a light clipping bore therethrough; thereby allowing the size of the light beam emitted by said adjustable beam lamp assembly to be changed by moving said light tube within said dome shaped eyeball collar.

According to still another aspect of the present invention provides for an adjustable beam lamp that may have the majority of its parts injection molded of plastic.

The present invention thus advantageously provides an adjustable beam lamp for use in automobiles, planes, railroad passenger cars and the like having long lamp life, cool operating temperatures, is easy to operate, and is cost effective.

BRIEF DESCRIPTION OF THE DRAWINGS

Finally.

DESCRIPTION OF THE PREFERRED EMBODIMENTS OF THE INVENTION

Figure 1:
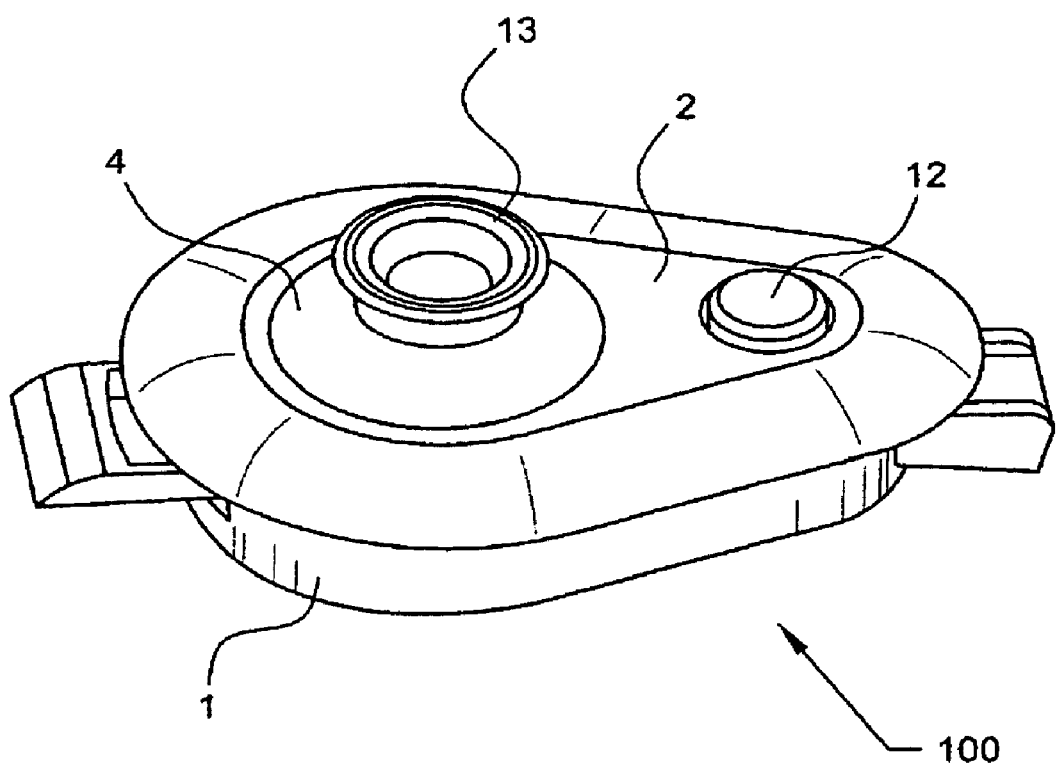
FIG. 1 shows a perspective front view of one preferred embodiment of the present invention.

Reference will now be made to the drawings, wherein to the extent possible like reference numerals are utilized to designate like components throughout the various views. Referring to FIG. 1, which presents a perspective front view of a preferred embodiment of the adjustable beam lamp 100 of the present invention having a lamp housing 1 with mounting bracket 5, bezel 2 with mounting bracket 3, dome shaped eyeball housing 4, light tube 13, and push/push button cover 12.

Figure 2:
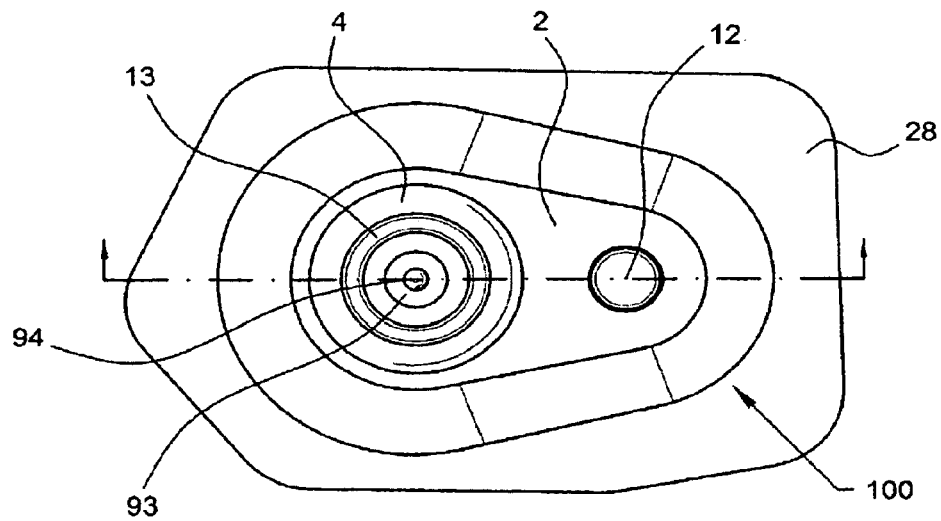
FIG. 2 shows a plan front view of one preferred embodiment of the present invention.

Referring now to FIG. 2, there is shown a plan front view of the adjustable beam lamp 100 showing the mounting bracket 5 of lamp housing 1, the bezel 2 with mounting bracket 3, dome shaped eyeball housing 4, push/push button cover 12, and the light tube 13 with mid wall 93 and light clipping bore 94 located therein.

Figure 3:
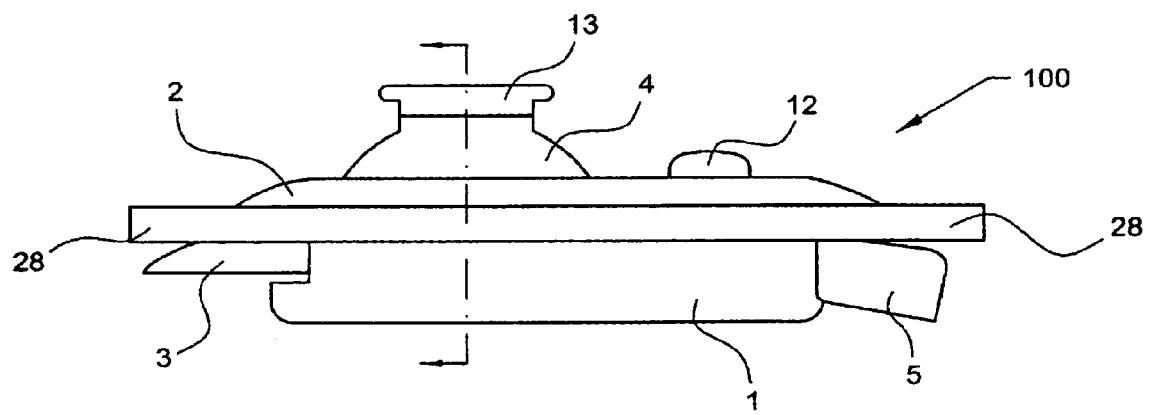
FIG. 3 shows a plan side view of one preferred embodiment of the present invention.

Turning now to FIG. 3, there is shown the adjustable beam lamp 100 in a plan side view showing lamp housing 1 with mounting bracket 5, bezel 2 with bezel mounting bracket 3, dome shaped eyeball housing 4, push/push button cover 12, and light tube 13, where the adjustable beam lamp 100 is mounted in head liner 28.

Figure 4:
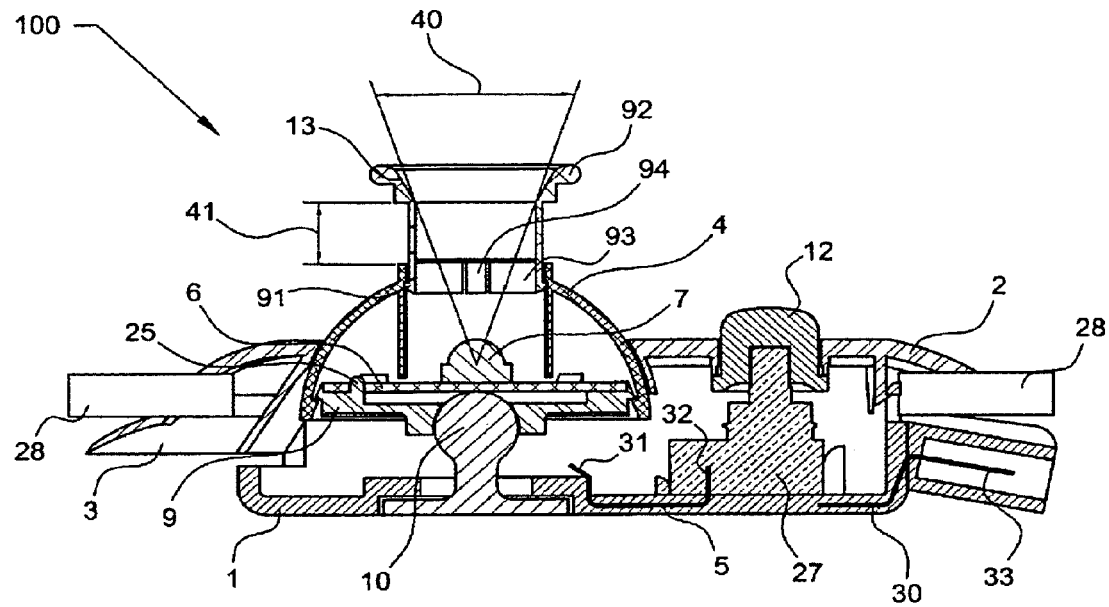
FIG. 4 show a plan cross section through line A-A of FIG. 2.

FIG. 4 shows a cross section plan view through line A-A of the adjustable beam lamp 100 of FIG. 2 comprising lamp housing 1 having mounting bracket 5, bezel 2, having bezel mounting bracket 3, dome shaped eyeball housing 4, lead frame 30, LED 7 mounted on LED board 6, flexible connecting wire 50 electrically connecting lead frame 30 to LED board 6, LED retainer 9, post ball 10, push/push switch 27, push/push button cover 12, and light tube 13. Also shown is in light tube 13 is mid wall 93 having light clipping bore 94 located therein. Further there is shown by double arrow 40 the angle of the light beam when light tube 13 is in its fully extended position as well as double arrow 41 showing the travel range of the light tube 13 within dome shaped eyeball housing 4. The adjustable beam lamp 100 shown mounted in headliner 28.

Figure 5:
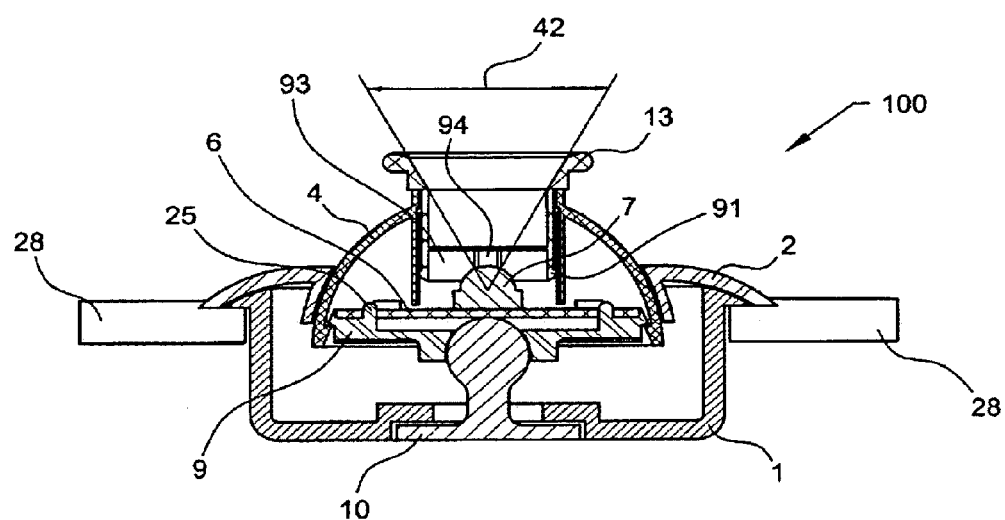
FIG. 5 shows a plan cross section through line B-B of FIG. 3.

FIG. 5 shows a cross section plan view through line B-B of the adjustable beam lamp 100 of FIG. 3 comprising lamp housing 1, bezel 2, and dome shaped eyeball housing 4, LED 7 mounted on LED board 6, LED retainer 9, and post ball unit 10. Also shown in light tube 13 is mid wall 93 having light clipping bore 94 located therein, and retaining snaps 91. Further there is shown by a double arrow 42 the angle of the light beam when light tube 13 is fully housed in dome shaped eyeball housing 4. The adjustable beam lamp 100 shown mounted in headliner 28.

Figure 6:
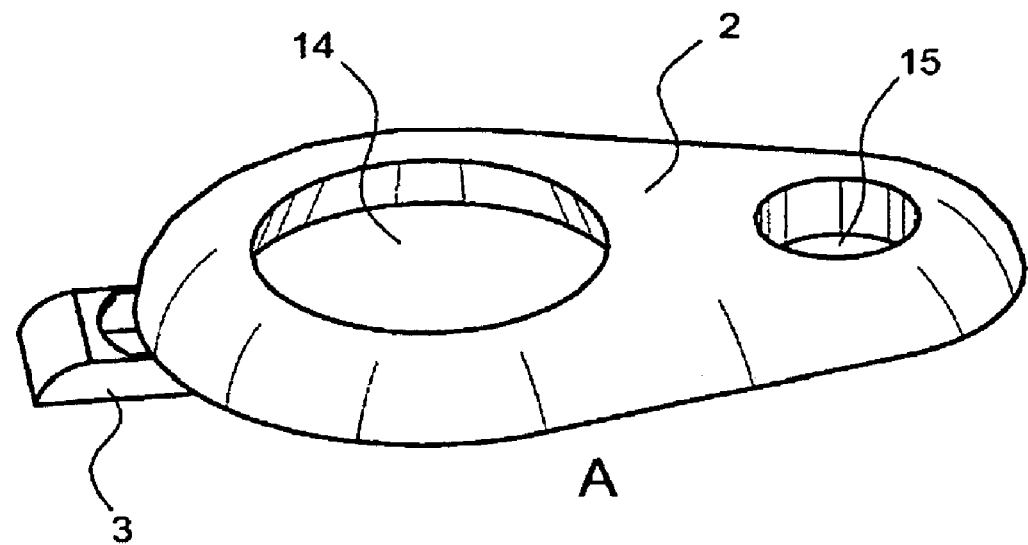
FIGS. 6a and 6b show perspective front and back views respectively of the lamp bezel of one preferred embodiment of the present invention.
Figure 6:
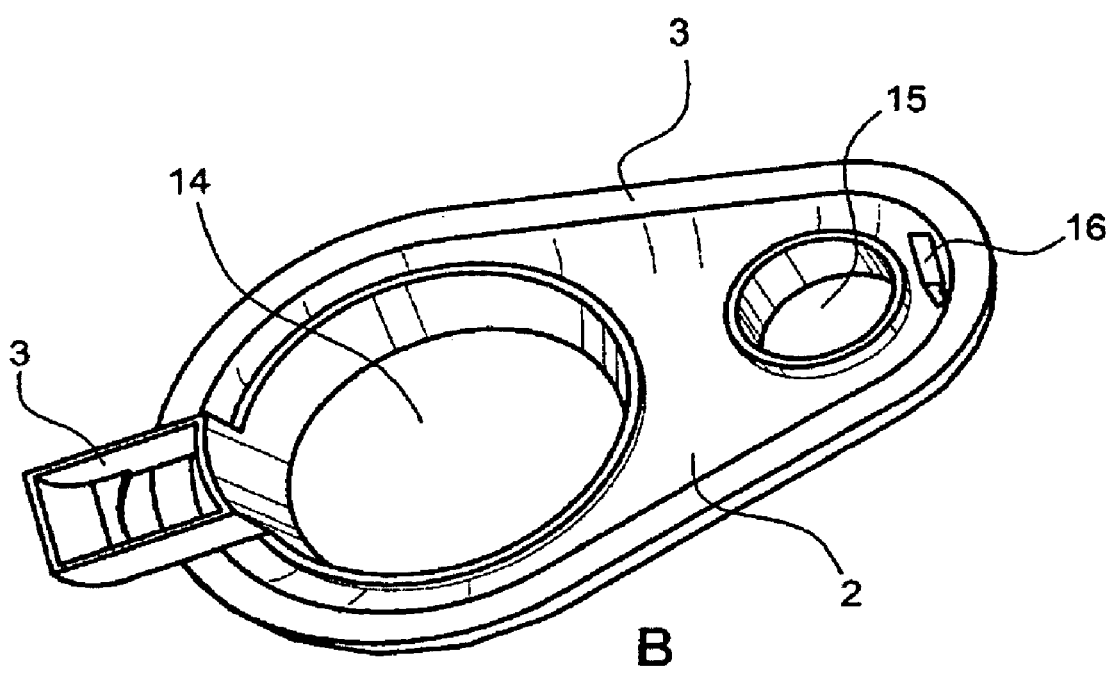

FIGS. 6a and 6b show perspective front and back views respectively of the bezel 2 having a first bore 14 thorough which the dome shaped eyeball housing 4 (FIG. 1) protrudes and a second bore 15 thorough which the push/push button cover 12 (FIG. 1) protrudes, as well as locking snap leg 16, and bezel mounting bracket 3.

Figure 7:
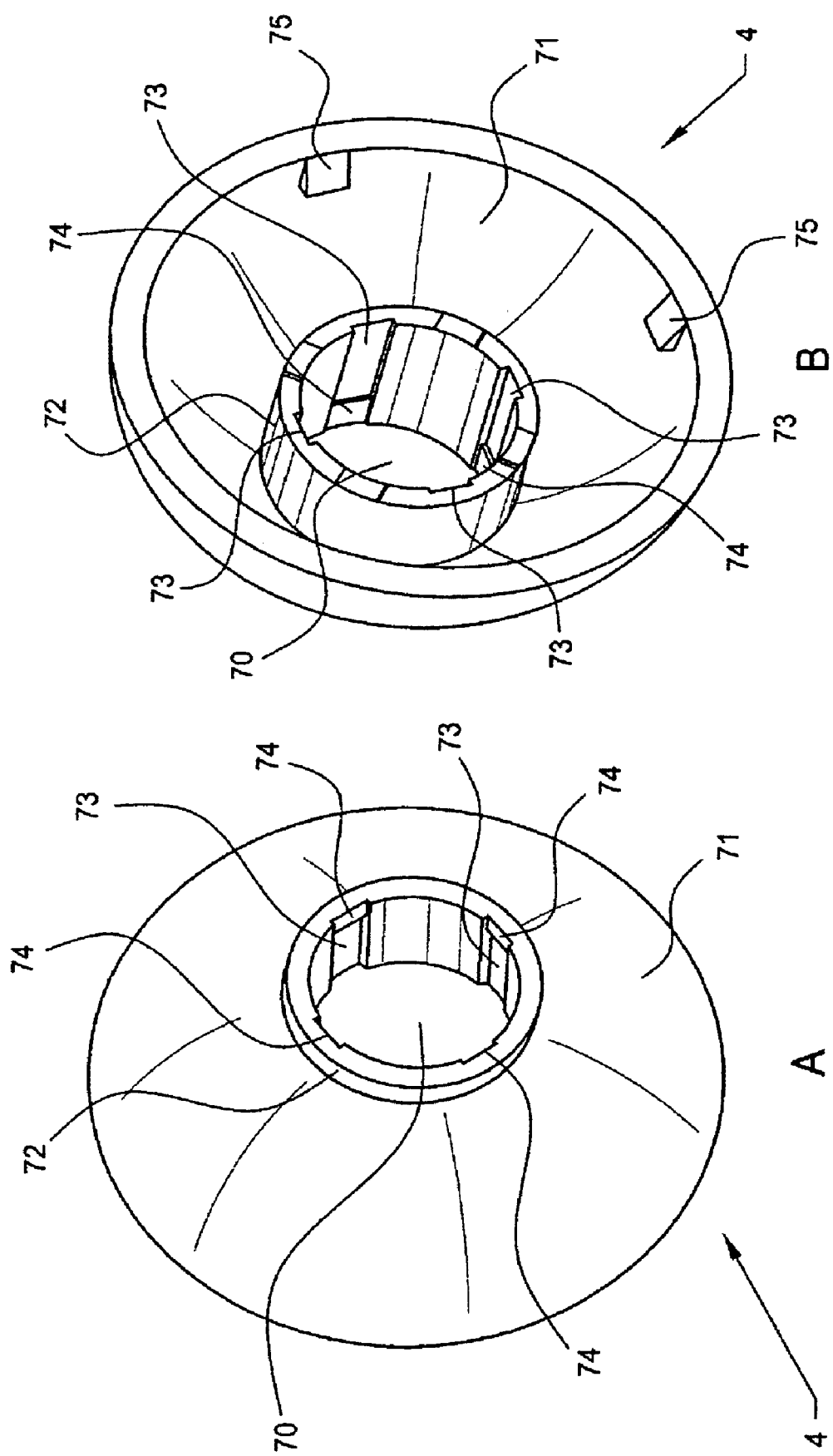
FIGS. 7a and 7b show perspective front and back views respectively of the dome shaped eyeball housing of the present invention.
Figure 8:
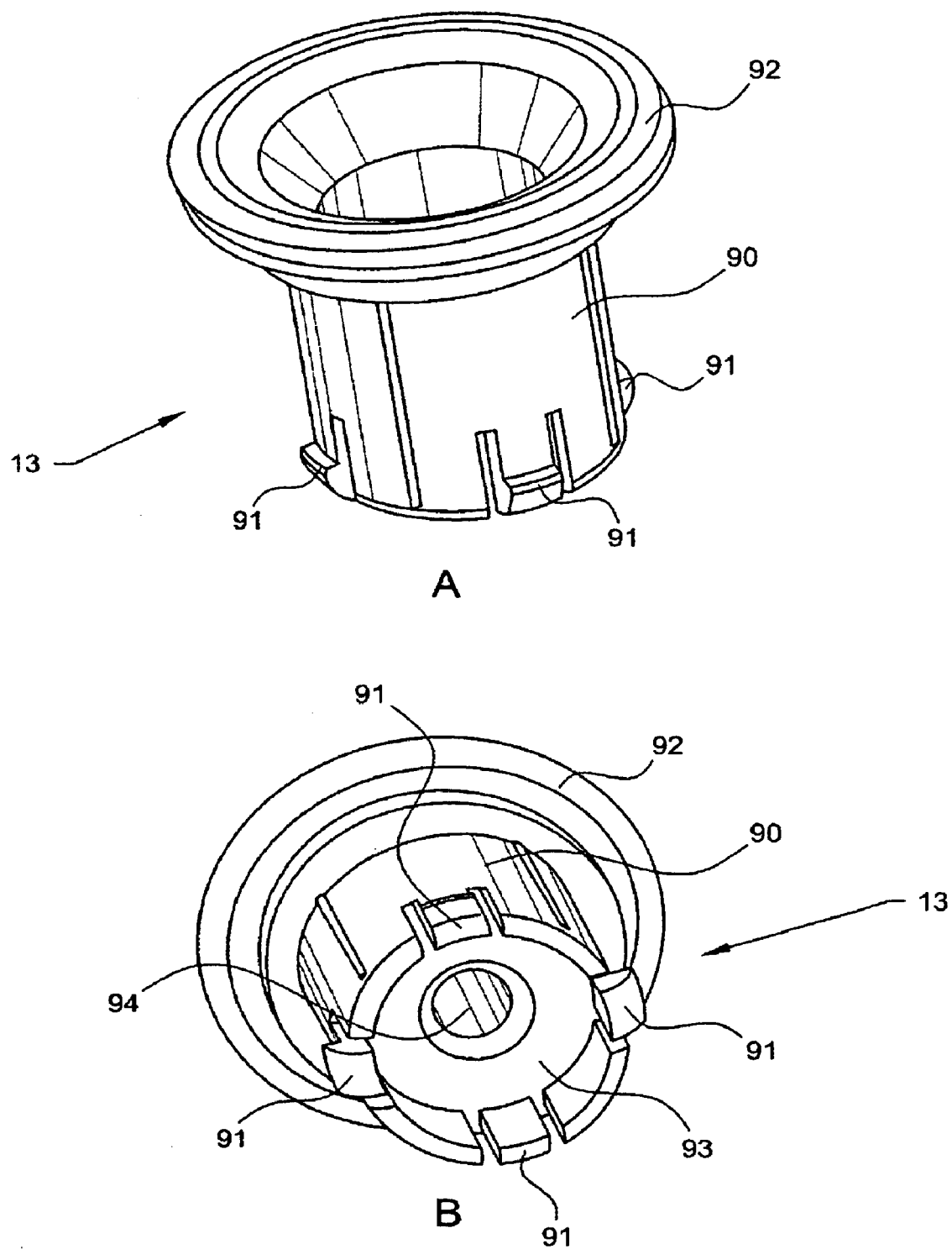
FIGS. 8a and 8b show perspective front and back views respectively of the light tube of the present invention.
Figure 14:
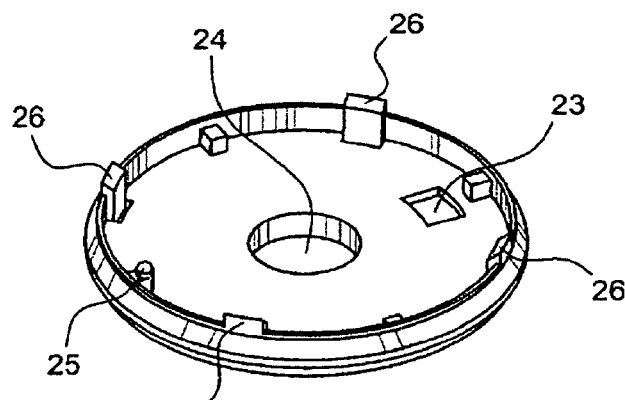
FIGS. 14a, and 14b shows perspective top and bottom views respectively of the LED housing of one preferred embodiment of the present invention.
Figure 14:
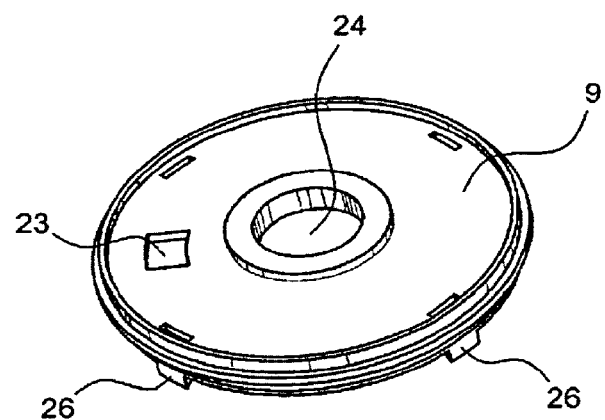

FIGS. 7a and 7b show perspective front and rear views of the dome shaped eyeball housing 4 respectively. Further shown in FIG. 7a is the front of eyeball 71 having collar 72 surrounding light bore 70, said collar 72 further comprising a plurality of grooves 73 having groove stops 74 located at the rearward portion of grooves 73. The plurality of grooves 73 accepting a complimentary plurality of retaining snaps 91 (FIG. 8) of light tube 13 (FIG. 8) and said plurality of groove stops 74 preventing light tube 13 (FIG. 8) from being pulled from dome shaped eyeball housing 4. Also further shown in FIG. 7b is the back of eyeball 71 having collar 72 surrounding light bore 70, said collar 72 further comprising a plurality of grooves 73 having groove stops 74 located at the rearward portion of grooves 73, and snap ribs 75 into which are engaged the outside edge of LED retainer 9 (FIGS. 14a and 14b). The plurality of grooves 73 accepting a complimentary plurality of retaining snaps 91 of light tube 13 and said plurality of groove stops 74 preventing light tube 13 from being pulled from dome shaped eyeball housing 4.

In FIGS. 8a and 8b is shown perspective front and back views respectively of the light tube 13 comprising a body tube 90 having located on the outside of a first end a plurality of retaining snaps 91 and located on the second end a flanged top 92. Also shown in FIG. 8b is the mid wall 93 having a light clipping bore 94 therein mounted within body tube 90.

Figure 9:
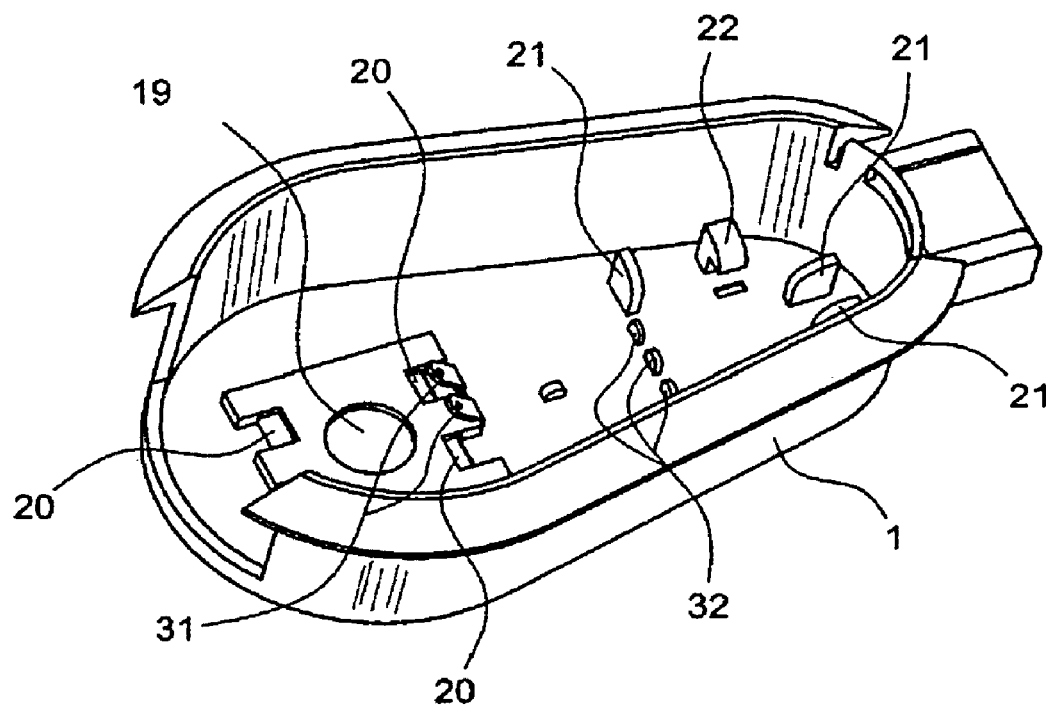
FIG. 9 shows a perspective front view of the lamp housing of the present invention with the lead frame mounted therein.
Figure 13:
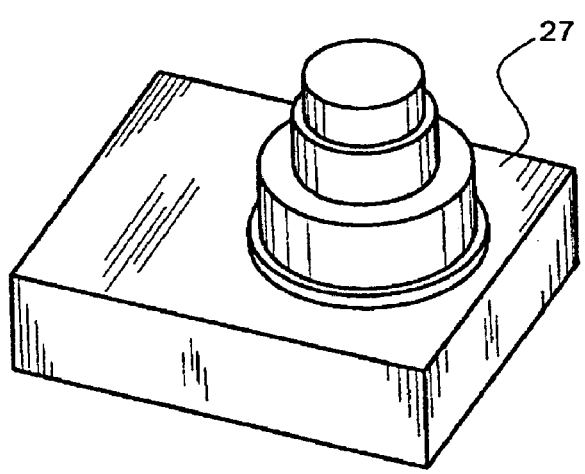
FIG. 13 shows a perspective view of a push/push switch suitable for use in the present invention.

FIG. 9 shows a perspective front view of the lamp housing 1 having a bore 19 for receiving post ball unit 10 (FIG. 11) as well as a plurality of bores 20 for receiving the snap legs 22 of post ball unit 10 (FIG. 11), and a plurality of mounting legs 21 and snap legs 22 for mounting push/push switch 27 (FIG. 13). Also shown are contact ends 31 and 32 of lead frame 30 mounted through complimentary openings in the lamp housing 1.

Figure 10:
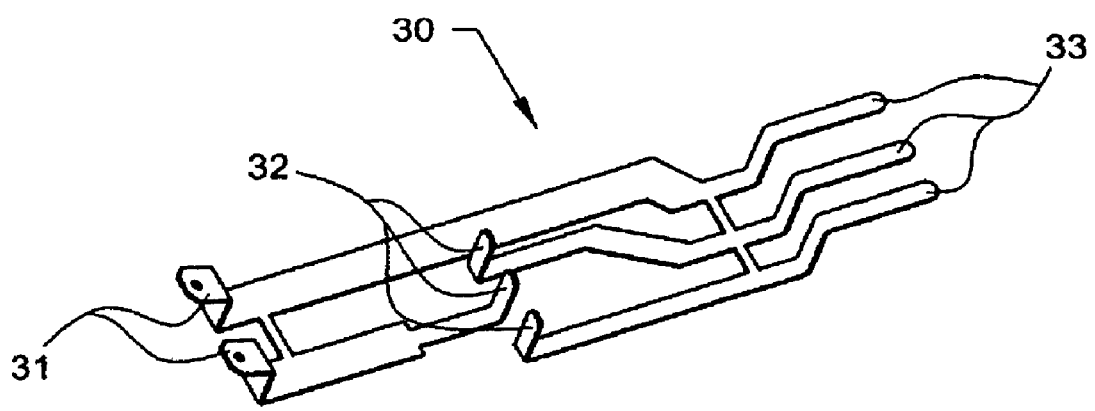
FIG. 10 shows a perspective front view of the lead frame of the present invention.

FIG. 10 shows a perspective view of the lead frame 30 suitable to provide electrical connection between the components of the present invention by way of the plurality of contacts 31, 32, and 33 and the electrical system of a vehicle in which the present invention is mounted.

Figure 11:
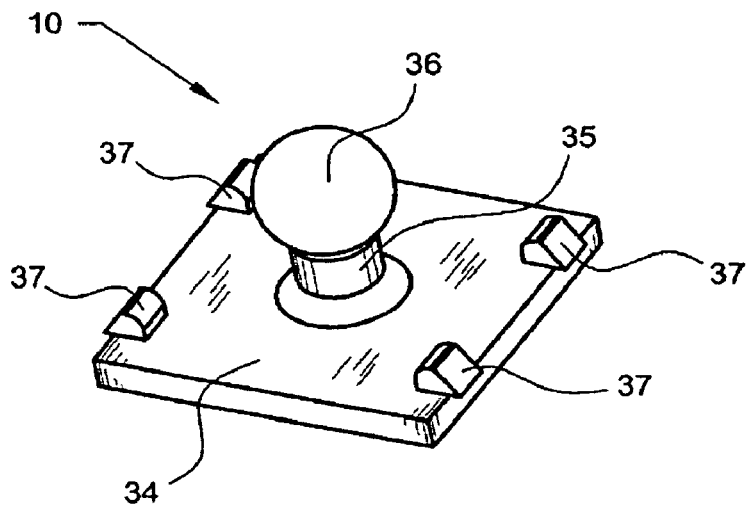
FIG. 11 shows a perspective view of the post and ball unit of the present invention.

FIG. 11 shows perspective view of the post ball unit 10 comprising a base 34 having located on the edges thereof a plurality of snap legs 37 and located in substantially the center thereof a post 35 having mounted thereon a ball 36.

Figure 12:
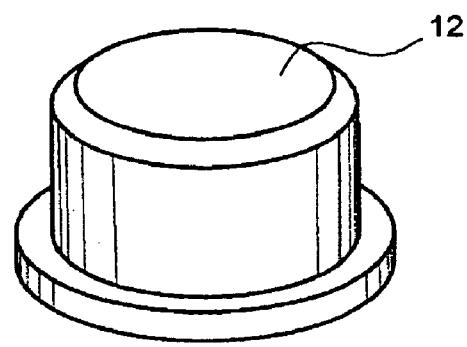
FIG. 12 shows a perspective view of a switch button suitable for use in the present invention.

FIG. 12 shows a perspective view of an example of a button cover 12 suitable for use in the present invention and dimensioned to fit over the push/push switch 27.

FIG. 13 shows a perspective example of a push/push switch 27 suitable for use in the present invention.

Shown in FIGS. 14a, and 14b are perspective front and back views respectively of the LED housing 9 having a plurality of snap legs 26, a LED board locating pin 25, ball mounting bore 24, and wiring routing bore 23.

Figure 15:
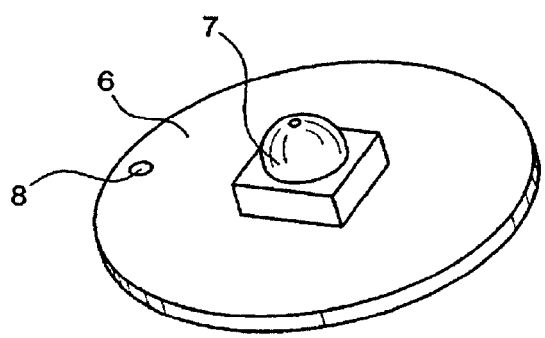
FIG. 15 shows a perspective view of a suitable LED mounted on a LED mounting circuit board of the present invention.

Finally, in FIG. 15 is shown a perspective front view of LED board 6 having a LED board locating bore 8, with an LED 7 mounted thereon.

The present invention preferably comprises all non-electrical conducting components from injection molded plastic, particularly plastic selected from the group comprising acrylonitrile butadiene styrene (ABS), nylon, glass-filled nylon, polypropylene, and acetyl.

It is to be understood that LEDs suitable for use in the present invention may emit white light or may emit colored light such a red to protect night vision of the driver for example. Suitable flexible wiring is well known in the art and needs no further description here. Presently preferred is flexible flat wire. The eyeball shaped dome has a radial angle of movement of from about 0 to about 30 degrees. The light tube has a range of movement from about 8 to about 10 mm and provides a light emitting angle of from about 15 to about 50 degrees, preferably of from about 16 to about 48 degrees.

In practice the adjustable beam lamp is turned off and on using the push/push button cover 12. The size of the light beam is adjusted by pulling out or pushing in the light tube 13 by grasping the flanged top 92. The area where the light falls, or is aimed, is controlled by the radial (side-to-side) movement of the eyeball shaped dome.

Although the preferred embodiments of the present invention has been disclosed, various changes and modifications may be made without departing from the scope of the invention as set forth in the appended claims.

What is claimed is:

1. An adjustable beam lamp assembly for use in passenger compartments comprising in cooperative combination:

a lamp housing insert, a bezel front and bezel back, dome shaped eyeball housing, a lead frame, an LED mounted on a LED board, a LED retainer socket front and LED retainer socket back, a ball post, a light tube, a push/push switch, and a push/push button;

wherein said dome shaped eyeball housing comprises an dome shaped eyeball having a collar surrounding a light passage bore, said collar extending through said eyeball and said collar further comprising a plurality grooves having groove stops located at a first end of said collar located on the convex side of said dome shaped eyeball;

said light tube moveable within said dome shaped eyeball collar and having a first end having located thereon a plurality of retaining snaps mountable within said complimentary plurality of collar grooves, having a second end a flanged top, and a mid wall located within said light tube wherein said mid wall has a light clipping bore therethrough;

wherein the LED/LED board is fixedly mounted within the assembled LED retainer socket, said LED retainer socket fixedly mounted to said dome shaped eyeball housing with the LED facing said light passage bore of said dome shaped eyeball housing;

thereby allowing the size of the light beam emitted by said adjustable beam lamp assembly to be changed by moving said light tube containing said light clipping bore within said dome shaped eyeball collar.

2. The adjustable beam lamp assembly as claimed in claim 1 wherein, said lead frame provides the electrical connections necessary to power the lamp from a vehicle power system.

3. The adjustable beam lamp assembly as claimed in claim 1 wherein, said assembly components other than said lead frame are composed of plastic.

4. The adjustable beam lamp assembly as claimed in claim 3 wherein, said plastic is selected from the group consisting of acrylonitrile butadiene styrene (ABS), nylon, glass-filled nylon, polypropylene, and acetyl.

5. The adjustable beam lamp assembly as claimed in claim 1 wherein, said light tube has a range of movement from about 8 to about 10 mm.

6. The adjustable beam lamp assembly as claimed in claim 1 wherein, said light tube provides a light emitting angle of from about 15 to about 50 degrees.

7. The adjustable beam lamp assembly as claimed in claim 1 wherein, said eyeball shaped dome has a range of radial movement of from about 0 to about 30 degrees.

8. The adjustable beam lamp assembly as claimed in claim 1 wherein, said LED emits white light.

9. The adjustable beam lamp assembly as claimed in claim 1 wherein, said LED emits colored light other than white light.

10. The adjustable beam lamp assembly as claimed in claim 1 wherein, said flexible connecting wire is flat wire.

* * * * *